(12) United States Patent
DePaor

(10) Patent No.: US 8,210,686 B2
(45) Date of Patent: Jul. 3, 2012

(54) PROJECTION SYSTEM

(75) Inventor: Declan G. DePaor, Norfolk, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 338 days.

(21) Appl. No.: 12/657,999

(22) Filed: Jan. 30, 2010

(65) Prior Publication Data

US 2010/0220296 A1 Sep. 2, 2010

Related U.S. Application Data

(60) Provisional application No. 61/206,426, filed on Jan. 30, 2009.

(51) Int. Cl.
*G03B 21/26* (2006.01)
(52) U.S. Cl. .............. 353/30; 353/62; 353/79; 434/285
(58) Field of Classification Search .................... 353/28, 353/30, 11, 62, 79; 434/111, 285–294
See application file for complete search history.

(56) References Cited

U.S. PATENT DOCUMENTS

| | | | |
|---|---|---|---|
| 2,592,444 A | 4/1952 | Matelena | |
| 2,803,165 A | 8/1957 | Sargenti | |
| 2,827,828 A | 3/1958 | Vaux | |
| 3,552,037 A * | 1/1971 | Stern | 434/286 |
| 3,594,964 A | 7/1971 | Clark | |
| 3,596,379 A | 8/1971 | Faulkner | |
| 3,695,751 A | 10/1972 | Watanuki | |
| 3,904,289 A | 9/1975 | Yager | |
| 4,597,633 A | 7/1986 | Fussell | |
| 4,955,714 A * | 9/1990 | Stotler et al. | 353/62 |
| 4,972,305 A | 11/1990 | Blackburn | |
| 5,457,508 A | 10/1995 | Ichihara | |
| 5,500,747 A | 3/1996 | Tanide | |
| 5,649,827 A * | 7/1997 | Suzaki | 434/284 |
| 5,762,413 A * | 6/1998 | Colucci et al. | 353/122 |
| 6,033,230 A | 3/2000 | Shiotsu | |
| 6,231,189 B1 * | 5/2001 | Colucci et al. | 353/20 |
| 6,286,962 B1 | 9/2001 | Hennes | |
| 6,409,351 B1 | 6/2002 | Ligon | |
| 6,554,434 B2 | 4/2003 | Sciammarella | |
| 6,698,900 B1 | 3/2004 | Young | |
| 6,733,136 B2 * | 5/2004 | Lantz et al. | 353/79 |

(Continued)

FOREIGN PATENT DOCUMENTS

JP 2001-13609 1/2001

OTHER PUBLICATIONS

Ramesh Raskar; "Multi-Projector Imagery on Curved Surfaces"; Mitsubishi Electric Research Labs; Jan. 1, 2004.

*Primary Examiner* — William C Dowling
(74) *Attorney, Agent, or Firm* — Williams Mullen

(57) ABSTRACT

A projection system having a set of projectors that cast images: (i) outwards onto the concave surface of a hemispherical dome, as is usual in planetariums and (ii) inward onto the convex surface of a centrally located sphere. The images thus cast may be coordinated by a controlling computer program, so that changes in the content or orientation of the images on the sphere result in corresponding changes in the images on the dome and vice versa.

15 Claims, 8 Drawing Sheets

U.S. PATENT DOCUMENTS

| | | | |
|---|---|---|---|
| 6,880,939 B2 * | 4/2005 | Colucci et al. | 353/122 |
| 6,905,218 B2 * | 6/2005 | Courchesne | 353/122 |
| 6,909,543 B2 * | 6/2005 | Lantz | 359/451 |
| 7,004,588 B2 * | 2/2006 | Sadler | 353/28 |
| 7,347,567 B2 * | 3/2008 | Deter et al. | 353/79 |
| 7,352,340 B2 | 4/2008 | Utt | |
| 7,438,422 B1 | 10/2008 | Castellano | |
| 7,463,415 B2 | 12/2008 | Shafer | |
| 7,604,354 B1 * | 10/2009 | Ligon | 353/30 |
| 7,621,647 B1 | 11/2009 | Colucci | |
| 2002/0196538 A1 | 12/2002 | Lantz | |
| 2004/0184013 A1 | 9/2004 | Raskar | |
| 2007/0097331 A1 * | 5/2007 | Sadler et al. | 353/79 |
| 2007/0159607 A1 | 7/2007 | Nishigaki | |
| 2008/0186415 A1 | 8/2008 | Boud | |
| 2008/0204666 A1 | 8/2008 | Spearman | |
| 2009/0027622 A1 | 1/2009 | Lalley | |
| 2009/0201430 A1 | 8/2009 | Streid | |

* cited by examiner

PROJECTION SYSTEM

RELATED APPLICATIONS

This application claims the benefit of U.S. Provisional Application No. 61/206,426, filed Jan. 30, 2009, which is hereby incorporated by reference in its entirety.

FIELD OF THE INVENTION

This invention relates to projection systems for domed spaces, including planetariums, and more particularly, to a combined convex-concave projection system. The present invention also includes systems with application to full-dome immersive media in general.

BACKGROUND OF THE INVENTION

A planetarium is a facility for the display of celestial bodies. For almost a century, planetariums have employed analog projection systems, sometimes referred to as an opto-mechanical star ball or globe. The star ball shines rays of light either through apertures and/or lenses onto a surface. In some cases, the surface is the concave surface formed by the ceiling or inner surface of a dome. This projector would typically be centrally located with respect to the dome in order to project an accurate image throughout the dome. In general, the apertures and/or lenses are defined within a star field plate, which sets the relative positions of the depicted celestial bodies. Such devices may be gear driven about gimbaled axes to simulate the natural keplerian patterns of celestial bodies in a desired movement with appropriate relative positions. In this way, different times, latitudes, orbital variables, etc., may be illustrated.

Early alternatives to opto-mechanical projection systems involved film display and wide angle lenses. Recently, digital projectors have begun to replace opto-mechanical devices. Some digital projectors are centrally located and project light onto the dome using a fish-eye lens. Others are located off-center and cast images onto the ceiling via reflection off an optically centered hemispheric mirror. In either case, they can create a vacancy in the center of the planetarium where the large opto-mechanical device used to be.

Thus, conventional planetarium projection systems generally include: (i) systems with a centrally located opto-mechanical star ball that projects points of light representing stars and discs of light representing planets, moon, and sun, onto the concave side of a white-painted dome-shaped ceiling; (ii) systems with a centrally located (or slightly off-center) digital projector with a fish-eye lens that projects digital images onto said dome; and (iii) systems with one or more peripherally located digital projectors that project a computer-warped digital image via a reflection off a hemispheric mirror onto said dome.

Because centrally located digital projection systems can be aligned with the pole of the dome, such systems may have less distortion. This can reduce the software, optics, and hardware expense, aiding in full dome coverage. Depending on the projector, central projection may have some color separation. Peripherally located digital projection systems free up the center of the domed space, but may be subject to distortion or gaps in coverage; peripheral projection is more complicated and may require additional software and hardware. Some peripheral systems require multiple projectors for full dome coverage.

Full-dome projection systems are of value in presenting information about the celestial bodies. However, it is difficult to convey to a planetarium audience the relationship between a view of the cosmos projected onto a dome and the location or perspective that such a view represents. The planetarium director is often limited to a verbal or numerical description of the latitude and longitude of an earth based perspective. Further, with non mechanical systems, the potential for changing the perspective to include non-earth based locations arises, even within a single showing; a particular planetary alignment, for example, may be viewed from a variety of perspectives.

Thus there is the opportunity to improve projection systems by synchronizing the inward and outward projected images, which would enable better visualization. In addition, there is a need for a projection system that enables visualization from a variety of viewpoints. Such a system would be useful also for full-immersive simulations and video beyond application as planetariums, astronomy, or planetary sciences. Aside from clear entertainment value, it is contemplated that such a system would have considerable value for education in geophysics, structural geology, physics (e.g., nuclear particles); chemistry (e.g., atoms, molecules, and nano-structures); biology (e.g., visualization of cells and organelles).

SUMMARY OF THE INVENTION

An aspect of embodiments of the present planetarium projection system is the pairing of concave (full-dome) projection systems with convex (spherical) projection systems and to coordinate the images thus projected in order to convey to the planetarium audience the spatial relationship between the cosmic scene portrayed on the dome and the current position and orientation of the celestial body (earth, moon, planet, sun etc) of the viewpoint.

The present invention provides a planetarium comprising a digital projection device or set of devices casting images on the concave side of the planetarium dome, a set of digital projection devices casting images on the convex side of a centrally located spherical screen, and a main computer running software that controls and coordinates all projected images.

Among other things, the present invention as described above has several aspects as described below:

(a) synchronization of the inward and outward projected images so that the planetarium audience is better able to visualize the significance of the cosmic scene and the relationship between the viewpoint of the observer and the scene that is observed.

(b) projection of the view from any viewpoint such as, but not limited to, the view from any point on the surface of the Earth (i.e., as opposed to a traditional geocentric view of the cosmos projected onto a Aristotelian celestial sphere); the view from any point on the surface of any planet, moon, asteroid or comet; the view from any point on the surface of the sun; the view from the center of the Earth, sun, moon or any celestial body, with coordination between said view and the image of the viewpoint as projected onto the central sphere.

DETAILED DESCRIPTION

An aspect of the projection system is to introduce a spherical projection system into a dome or planetarium to convey the relative orientation and relationships of celestial bodies. Given the limitations of conventional digital projection systems, the present system involves use of a convex (spherical) projection system with embodiments of a concave (full-dome) projection system; the images projected by such systems may be coordinated in order to convey to an audience the spatial relationship between the depicted celestial bodies. This enables the clear illustration of relative positioning, 'especially given digital projection systems' adaptability for display with the plurality of perspectives. Thus, spherical projection systems are of value in presenting information related to the relation of proximate celestial objects, such as the relative position, rotation, motion, etc., of the earth to the moon, sun, or other planets.

The variability means that a depiction may alternately display from a perspective from earth followed by the perspective from the other celestial object, which in turn may be followed by a completely different set of images for other celestial bodies. Importantly, the image projected onto a central sphere may change from geocentric to heliocentric or to any planet or moon, scaffolding the observer's exploration of difficult concepts such as retrograde planet "wandering." As another example, an oscillating image projected onto a sphere might represent the plane of motion of a Foucault pendulum, while a rotating projection low on the dome may show a physical Foucault pendulum swinging and undergoing precession.

Embodiments of spherical projection systems may include: (i) systems with a set of projectors for projection onto the convex outer surface of a reflective or white-painted sphere, typically with the set of projectors often located high on the walls of the room containing the sphere; or (ii) systems in which projection onto the surface of a transparent sphere originates from inside the sphere. Some spherical projection systems using the former approach locate those projectors in rooms other than the dome.

Figure 1:
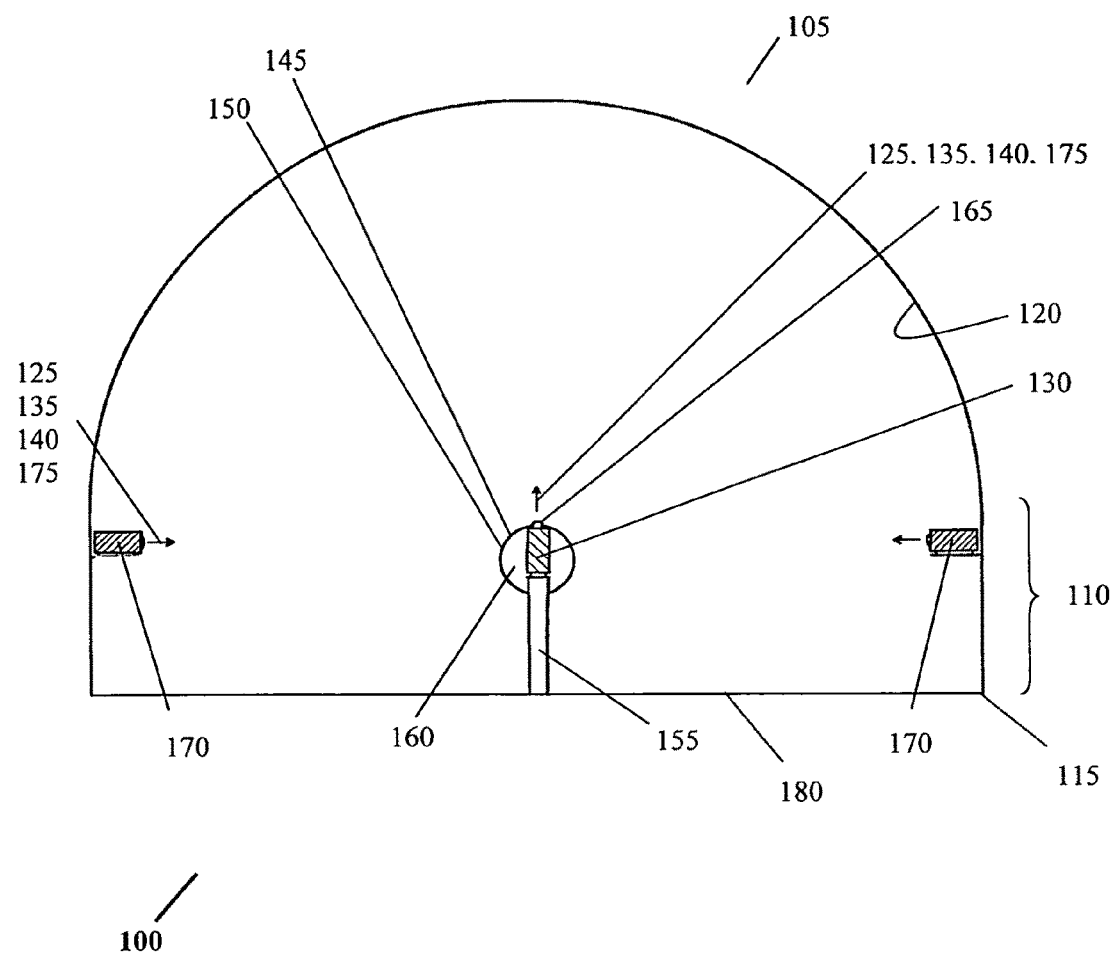
FIG. 1 is a side view of an embodiment of the projection system, along a north-south or east-west cross section.

Embodiments according to the present approach will be described hereinafter with reference to the accompanying drawings. FIG. 1 illustrates an embodiment of a projection system [100] for a planetarium. In this embodiment, a dome [105] is shown having a concave interior with a lower side wall [110] at its lower wall end [115]. The dome [105] interior is bounded by the dome inner surface [120] of the dome interior. Preferably, the dome inner surface [120] will have a desired diffuse reflectivity suitable for receipt of projected images [125]. Diffuse in this sense is to contrast with specular or simply a reflectivity that would be unsuitable for use as a projection screen. A dome projector [130] is situated within the dome [105], oriented to project at least a first dome projected image [140] (not shown) at least partially onto the inner surface [120] of the dome [105]. For example, the reference axis [135] projected image [125] of the dome projector [130] is indicated with a vertical arrow. The dome projected image [125] is distributed across the dome inner surface [120] of the planetarium dome [105]. In this way, dome projector [130] may produce a first dome projected image [140] (shown as an arrow) on the dome inner surface [120].

A reflective sphere [145] is shown at a central point within the dome [105]. Reflective sphere [145] may be comprised of metal, ceramic, glass, plaster, plastic, wood, or other material capable of presenting a sphere outer surface [150] having a desired reflectivity. Preferably, the sphere outer surface [150] will have a desired diffuse reflectivity suitable for receipt of at least a first projected image [140]. The reflective sphere [145] may be painted white or gray on the sphere outer surface [150] so as to enable a diffuse reflectivity like that of a projection screen.

In the embodiment of FIG. 1, a central base [155] is provided, which may be in the form of sufficient structure for supporting the reflective sphere [145] and dome projector [130] at a desired height. Central base [155] may take a variety of forms, such as a pedestal or plinth, a column, a rigid rod or support connected to reflective sphere [145], a fixed point of attachment to some other structure such as the floor [180]. Central base [155] may be of any sufficiently rigid material for this function, such as metal, ceramic, glass, plaster, plastic, wood, or other suitable material. Alternatively, reflective sphere [145] may be supported by guylines or wires, so long as the quality of the sphere projected image [175] is acceptable.

In the embodiment shown, central base [155] supports the primary dome projector [130] and reflective sphere [145]. In this embodiment, reflective sphere [145] is shown as comprising a shell that defines a reflective sphere interior space [160] of reflective sphere [145]. Dome projector [130] may be disposed within the reflective sphere interior space [160] at least partially. The degree to which dome projector [130] is disposed within interior space [160] is a trade off between the potential of interference with any sphere projected images [125] on the sphere outer surface [150] of reflective sphere [145] and the convenience of access to the dome projector [130]. Reflective sphere [145] may be constructed in parts capable of being fastened together or unfastened so that access can be had to the enclosed dome projector [130] for service. Alternatively, reflective sphere [145] may simply have sufficient doors or panels (not shown) providing access to dome projector [130]. As may be seen in FIG. 1, primary dome projector [130] is oriented within reflective sphere [145] so as to project through a projection port at least partially onto the dome inner surface [120]. For this embodiment, a lens [165] such as a fisheye lens may be disposed at the output of dome projector [130] in order to increase coverage of the projected image [125] onto the dome inner surface [120].

A plurality of peripheral projectors [170] may be disposed about the lower side wall [110]. For convention, each projector projects an individual projection [125]. The plurality of peripheral projectors [170] may be disposed about the lower side wall [110] of the dome [105] at substantially equidistant points, with each of the peripheral projectors [170] oriented so as to project complementary individual projections [125] onto the sphere outer surface [150] of the reflective sphere [145] and adapted to produce a sphere projected image [175] (not shown) corresponding to at least one celestial body on the sphere outer surface [150]. Substantially equidistant simply means sufficiently regularly spaced so as to project onto reflective sphere [145] with desired complementing image portions or individual projections [125]. The individual peripheral projectors [175] may project with some overlap, for example, so long as the final quality of sphere projected image [175] is acceptable. In addition, computer software control program may accommodate some irregularities to enhance the sphere image [175] to some extent. In addition, other desired lenses [165] may compensate for some irregularities. The peripheral projectors [170] may have lenses [165] such as telescopic lenses, with the reference axis [135] of their projected image portions [125] indicated by the shown arrows shown pointing inwards towards the convex sphere outer surface [150] of the centrally mounted reflective sphere [145].

In this way, the relative position of a first celestial body depicted within the first dome projected image [140] on the dome inner surface [120] to a second celestial body depicted by the first sphere projected image [175] on the sphere outer surface [150] is adapted to illustrate a desired spatial relation between the first and second celestial bodies.

Figure 2:
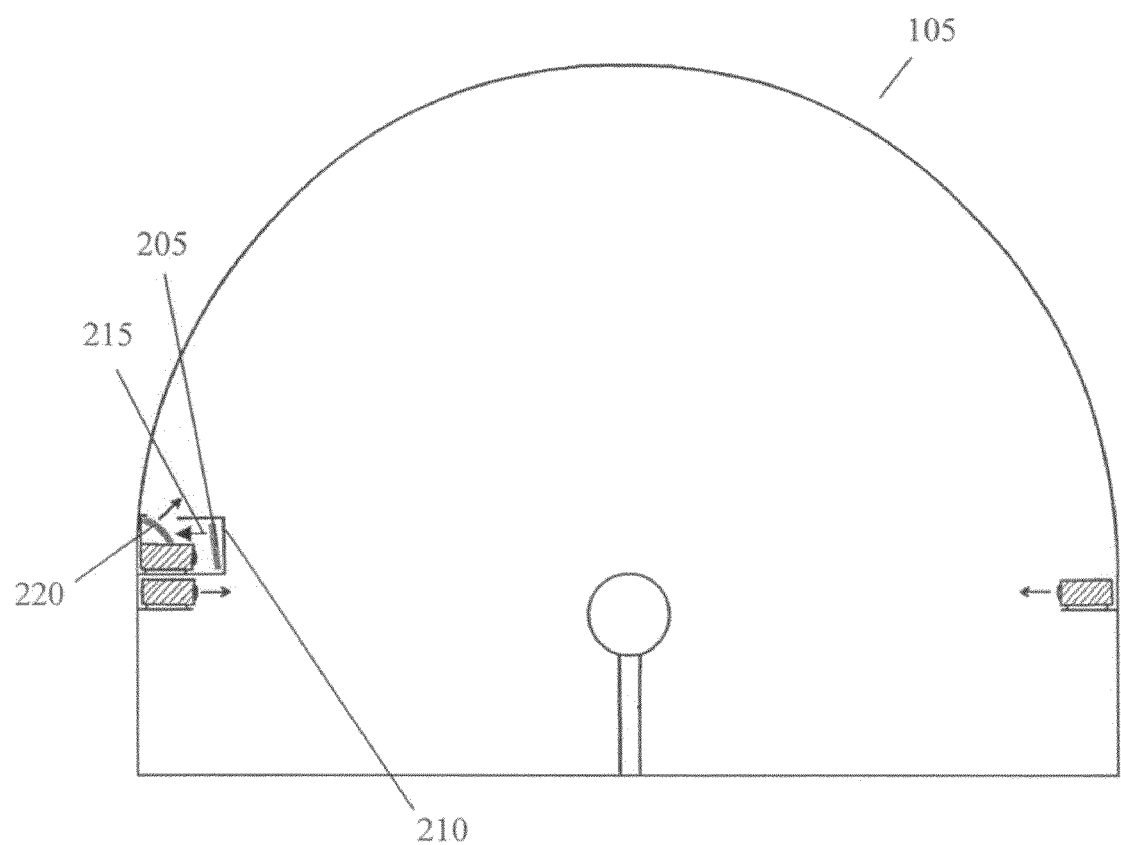
FIG. 2 is another embodiment of FIG. 1

FIG. 2 illustrates a different embodiment of the projection system [100] within dome [105]. In this example, dome projector [130] is not centrally mounted, but disposed near a lower side wall [110]. The dome projector [130] may project individual projection [125] onto the concave dome inner surface [120] of dome [105]. The dome projector [130] individual projection [125] is directed to a planar mirror [205] in a mirror shroud [210]. A first reflected image [215] (shown by the arrow) is then reflected onto a hemispheric mirror [220]. The individual projection [125] is then directed to the dome inner surface [120]. The dome projector [130] projection path may be direct or indirect via one or more mirrors to the dome inner surface [120], as shown. In this embodiment, there is no central lens [165] and the reflective sphere [145] may be solid.

Figure 3:
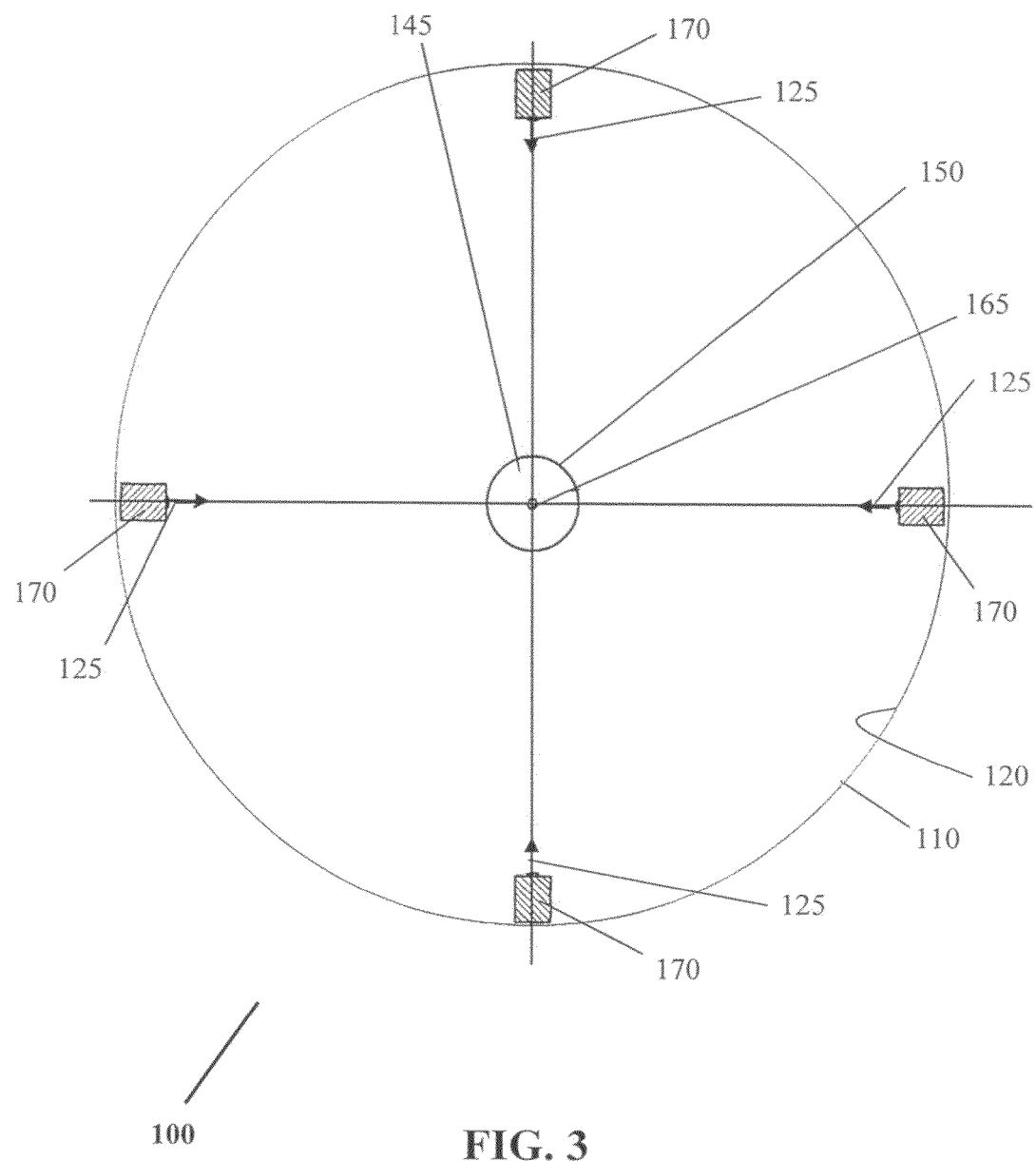
FIG. 3 is a plan view of the system in FIG. 1

FIG. 3 shows a plan view of an embodiment of the projection system [100]. In this example, lens [165] is illustrated as a fisheye lens with reflective sphere [145], illustrating that dome projector [130] (not shown) is according to the configuration of FIG. 1, within reflective sphere [145]. As shown in this case, four peripheral projectors [170] are provided. Two peripheral projectors [170] are disposed about the lower side wall [110] on a north-south axis and two peripheral projectors [170] are disposed about the lower side wall [110] on an east-west axis. Other arrangements of peripheral projectors [170] will suffice so long as the individual projections [125] are directed onto reflective sphere [145] in a desired manner to provide a preferably near-full, coverage of the sphere outer surface-[150] exposed or visible to viewers.

Figure 4:
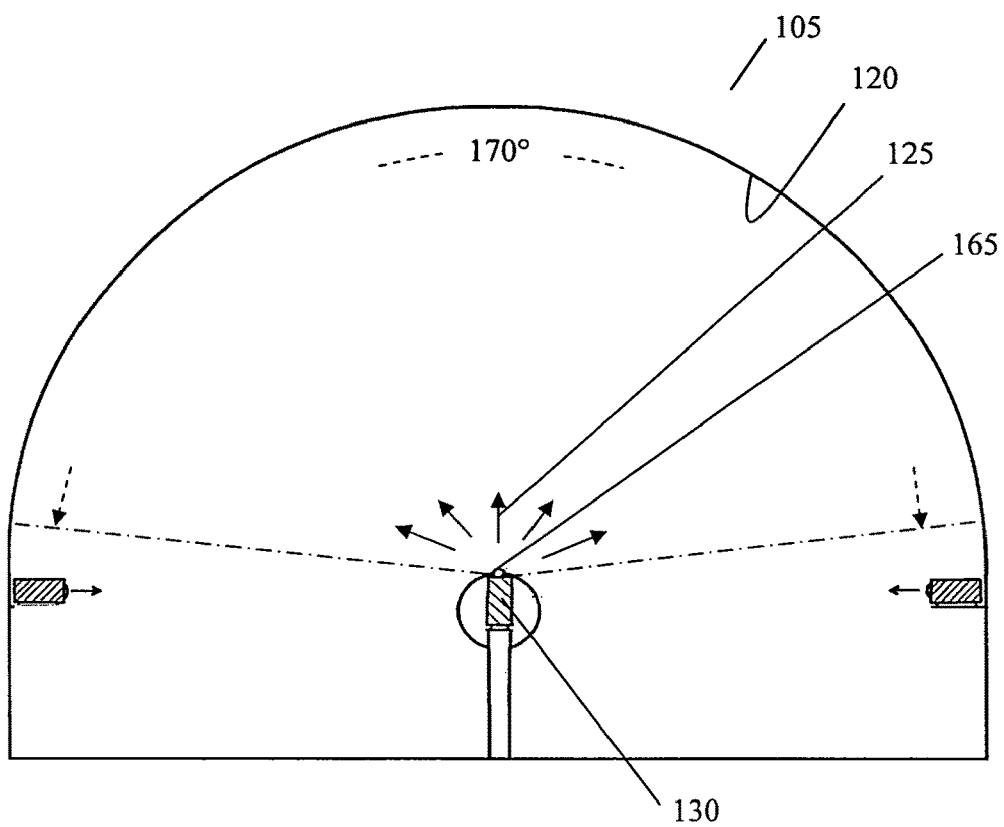
FIG. 4 shows the extent of the outward projection from the fish-eye lens projector onto the concave dome.

FIG. 4 shows a side view of an embodiment of the projection system [100]. In this case, the width of the individual projection [125] emerging from (fish eye) lens [165] from the dome projector [130] is shown for an embodiment of dome projection according to FIG. 1. The illuminated region is shown in above the phantom line and the non-illuminated region below. The lens [165] casts a individual projection [125] over most of the dome interior surface [120] of the dome [105]. In this embodiment the angle of coverage shown was 170-degrees+/−, which was achieved for a dome [105] with a radius of 20 feet.

Figure 5:
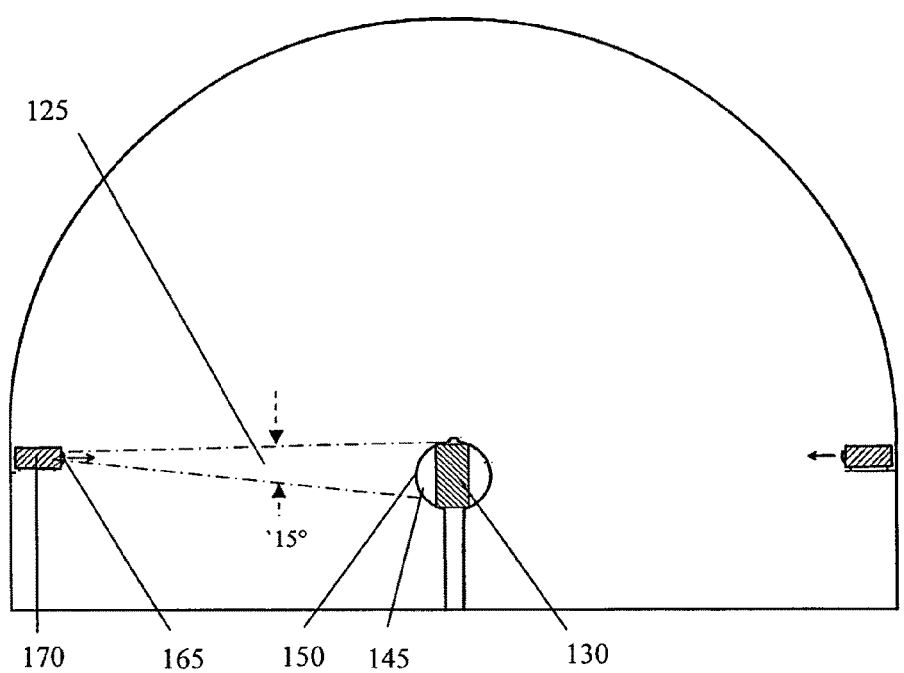
FIG. 5 shows the extent of the inward projection of a typical peripheral projector onto the central convex sphere.

FIG. 5 shows a side view of an embodiment of the projection system [100]. In this case, the width of the projected light emerging from the (telephoto) lens [165] of a typical peripheral projector [170] is shown incident onto the convex sphere outer surface [150] of centrally located reflective sphere [145]. Each peripheral projector [170] may light or illuminate a complementary portion of the reflective sphere [145]. A computer software control program may be used to coordinate an overlap and "stitching" or combining of the plurality of complementary individual projections [125]. The control program may reside or be recorded on memory in communication with at least one computer processor which, in turn, would be in communication with the plurality of peripheral projectors [170]. Optionally, computer processor would be in communication with and control the primary dome projector [130] as well.

Figure 6:
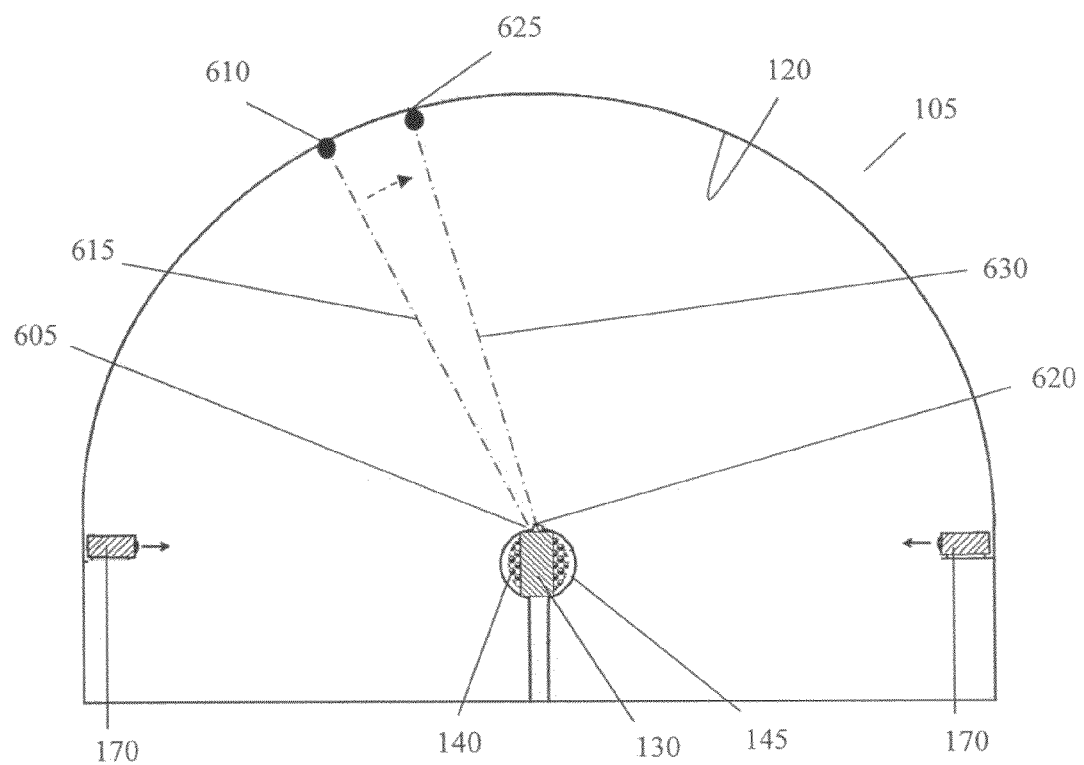
FIG. 6 illustrates the coordination of images projected onto the dome and the sphere.

FIG. 6 shows a side view of an embodiment of the projection system [100]. This figure illustrates the coordination of peripheral projectors [170] with dome projector [130]. For example, at a first time the peripheral projectors [170] create a first sphere projected image [175], such as the celestial body of the Earth, on the centrally located reflective sphere [145] with the Earth's pole projected at Earth position [605]. Dome projector [130] may create a full dome image with the celestial body star Polaris projected at the first Polaris point [610] on the dome inner surface [120] of dome [105]. Projected image line [615] illustrates the relation between the celestial bodies with points [605] and [610], in the direction of a radius of the dome [105].

At a second, later time, the user may choose to rotate the image of the Earth so that its pole now projects at Earth point [620] (i.e., a second sphere projected image). A control program may automatically move the image on the full dome [105] so that the star Polaris now projects at Polaris point [625] (i.e., a second dome projected image). Secondary projected image line [630] illustrates the relation between the celestial bodies with points [620] and [625], in the direction of a radius of the dome [105]. The control program may achieve this coordination by means of quaternion operations.

Figure 7:
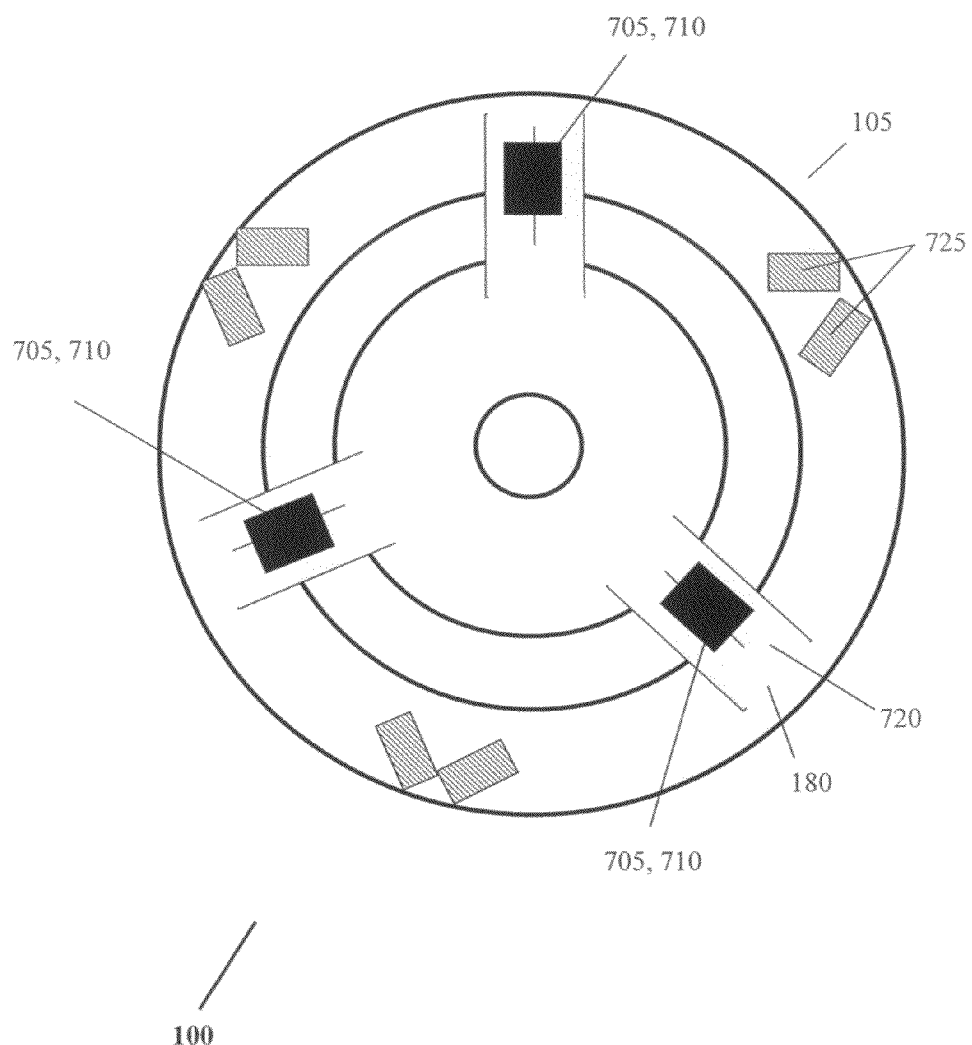
FIG. 7 is an optional aspect of embodiments of the system.

FIG. 7 shows a top view of an optional aspect for embodiments of the projection system [100]. One or more mobile screen stands [705] or rovers [710] is provided. Rover [710] refers to mobile screen stands configured for transport along a desired path. In some embodiments, rovers [710] may be mounted on wheels with extendible arms and robotic motion controls. However, other transport mechanisms are available and the system herein is not so limited. The rovers [710] may carry a variety of 2-dimensional or 3-dimensional reflective screens [715] abound the interior of the dome [105]. For example, as shown in FIG. 7, such a desired path may be along aisles [720] when attendees are seated in place; if seating is removed, a more diverse path may be available. One or more rover projectors [725] may be disposed about dome [105], in locations appropriate for the path of rovers [710]. A computer control program may coordinate the roving projected images (not shown) on the mobile screens [705] as appropriate. The computer control program may reside on the memory of a computer in communication with the rover projectors [725] and the rovers [710].

Figure 8:
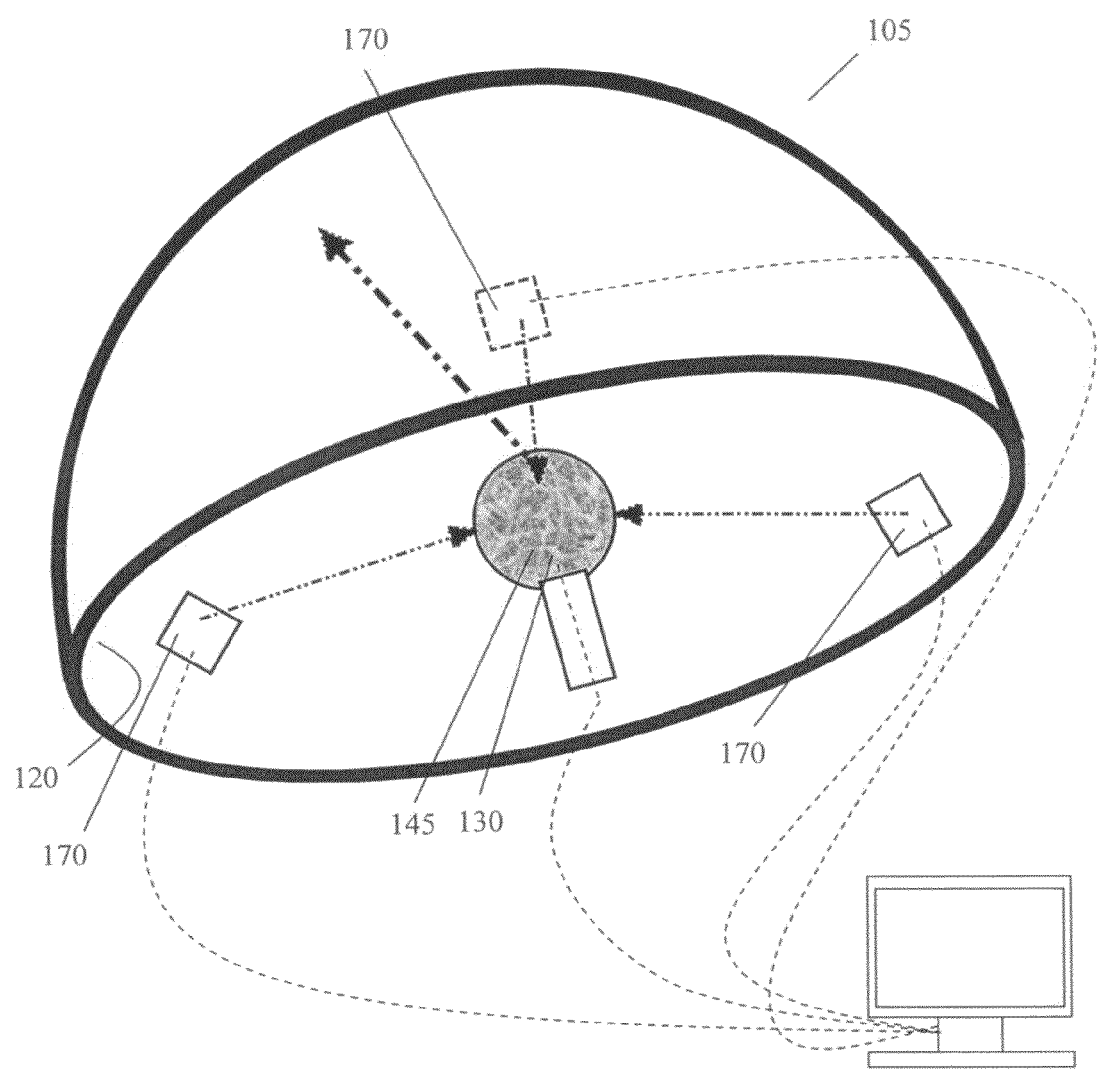
FIG. 8 is an aspect of an embodiment of the projection system.

FIG. 8 is an example of the projection system [100] with an image of the earth projected onto the reflective sphere [145] while stars visible from earth's zenith are projected onto the dome inner surface [120] of dome [105]. A computer processor with a memory is shown in communication with peripheral projectors [170] and dome projector [130].

The projection system [100] of the present invention may extend to a computer readable medium storing a computer program for use with a dome [105] having a concave inner surface [120] and a side wall [110] at its lower end [115]. The dome [105] interior with an inner surface [120] has a desired diffuse reflectivity and a reflective sphere [145] mounted at a central point within the concave interior of the dome [105]. The reflective sphere [145] having a sphere outer surface [150] of a desired diffuse reflectivity. The computer readable medium may store control program code for receiving and storing data about the relative orientation of at least a first celestial body to a second celestial body, the data representing a plurality of images. Preferably, the relative orientation changes extend to a variety of changes, such as keplerian motion, changes in perspective, rotation of a celestial body, etc. The computer readable medium may also store control program code for controlling a primary dome projector [130] situated within the dome [105], and oriented so as to project at least partially onto the dome inner surface [120] of dome [105], and adapted to produce a first dome projected image [140] of the first celestial body on the dome inner surface [120]. The computer readable medium may also store a control program code for controlling one or more peripheral projectors [170], the peripheral projectors [170] being disposed about the lower side wall [110] of the dome (optionally at substantially equidistant points), with each of the peripheral projectors [170] oriented so as to project on complementary portions of the sphere outer surface [150] of the reflective sphere [145], and adapted to produce a first sphere projected image [175] on reflective sphere [145] corresponding to the second celestial body on such sphere outer surface [150]. Upon receipt of an instruction corresponding to a change in relative orientation of the first and second celestial bodies, the control program code may apply a quaternion operation for creating a subsequent (e.g., a second) dome projected image [140] on the dome inner surface [120] and a subsequent (e.g., a second) sphere projected image [805] (not shown) on reflective sphere [145] to illustrate the change in orientation of the first celestial body to the second celestial body. The computer medium may also include control program code adapted to the variations in the projection system [100] discussed above.

It is to be understood that various modifications and variation of the specific embodiments described herein will be readily apparent to those skilled in the art in light of the above teachings without departing from the spirit and scope.

What is claimed is:

1. A projection system for use within a dome having a concave interior and a side wall at its lower end, the dome interior having an inner surface with a desired diffuse reflectivity, the system comprising:
    (i) a reflective sphere mounted at a central point within the concave interior of the dome, the reflective sphere having an outer surface of a desired diffuse reflectivity;
    (ii) a dome projector situated within the dome, and oriented so as to project at least partially onto the dome inner surface of the dome, and adapted to produce a first dome projected image of a first celestial body on the dome inner surface;
    (iii) a plurality of peripheral projectors, the peripheral projectors disposed about the lower side wall of the dome, with each of the peripheral projectors oriented so as to project on complementary portions of the outer surface of the reflective sphere, and adapted to produce a first sphere projected image corresponding to a second celestial body on the outer surface of the reflective sphere; and
    (iv) wherein the relative position of the first dome projected image on the inner surface of the dome to the first sphere projected image on the outer surface of the reflective sphere is adapted to illustrate a desired orientation between the first and second celestial bodies.

2. The projection system of claim 1, further comprising:
    (i) a computer processor in communication with the dome projector and the plurality of peripheral projectors; and
    (ii) a memory in communication with the computer processor, the memory for recording a control program for directing the primary dome projector and the plurality of peripheral projectors so as to produce the first dome projected image and the first sphere projected image in a desired manner.

3. The projection system of claim 1, further comprising:
    (i) a computer processor in communication with the dome projector and the plurality of peripheral projectors;
    (ii) a first memory in communication with the computer processor for storing data about the relative orientation of at least the first celestial body to the second celestial body, the data representing a plurality of images;
    (iii) a second memory in communication with the computer processor, the memory for recording a control program for directing the dome projector and the plurality of peripheral projectors; and
    (iv) wherein, upon the receipt of an instruction corresponding to a change in relative orientation of the first and second celestial bodies, the control program applies a quaternion operation for creating a second dome projected image and a second sphere projected image to illustrate the change in orientation of the first celestial body to the second celestial body.

4. The projection system of claim 1, wherein the plurality of peripheral projectors are disposed at substantially equidistant points about the lower side wall of the dome.

5. The projection system of claim 1, further comprising a hemispheric mirror, and wherein the dome projector is peripherally mounted with the hemispheric mirror configured within the path of the dome projector output, so that the dome projector is able to project at least partially onto the hemispheric mirror, and the dome projector and hemispheric mirror are configured so as to project onto the dome inner surface to produce the first dome projected image of a first celestial body on the inner surface.

6. The projection system of claim 1, wherein:
    (i) the reflective sphere comprises a shell that defines an interior space; and
    (ii) the dome projector is disposed at least partially within the interior space of the dome, and is oriented so as to project at least partially onto the dome inner surface of the dome.

7. The projection system of claim 1, further comprising:
    a fish eye lens;
    wherein the reflective sphere comprises a shell that defines and surrounds an interior space, the shell having a projection port at an upper end of the reflective sphere; and
    wherein the dome projector is disposed within the interior space, and is oriented so as to project through the projection port, through the fish eye lens, and at least partially onto the dome inner surface.

8. The projection system of claim 1, further comprising:
    (i) at least one mobile screen configured for transport along a desired path; and
    (ii) at least one mobile screen projector.

9. The projection system of claim 1, further comprising:
    (i) a computer processor in communication with the dome projector and the plurality of peripheral projectors;
    (ii) a first memory in communication with the computer processor for storing data about the relative orientation of at least the first celestial body to the second celestial body, the data representing a plurality of images;
    (iii) a second memory in communication with the computer processor, the memory for recording a control program for directing the dome projector and the plurality of peripheral projectors;
    (iv) at least one mobile screen configured for transport along a desired path;
    (v) at least one mobile screen projector adapted to project at least partially onto the at least one mobile screen, wherein the computer processor is further in communication with the mobile screen and at least one mobile screen projector, and wherein the control program is adapted to directing the transport of the at least one mobile screen and for directing the at least one mobile screen projector;

(vi) a third memory in communication with the computer processor, the memory for storing data about representing a plurality of projected images suitable for the mobile screen;

(vii) wherein, upon the receipt of a first instruction corresponding to a change in relative orientation of the first and second celestial bodies, the control program applies a quaternion operation for creating subsequent projected images to illustrate the change in orientation of the first celestial body to the second celestial body; and (vii) wherein, upon the receipt of a second instruction relative to the creation of a mobile image, the control program applies a projected image suitable for the mobile screen from the at least one mobile screen projector onto the at least one mobile screen.

10. A computer readable medium storing a computer program for use with a dome having a concave interior and a side wall at its lower end, the dome interior with an inner surface having a desired diffuse reflectivity and a reflective sphere mounted at a central point within the concave interior of the dome, the reflective sphere having an outer surface of a desired diffuse reflectivity, the computer readable medium comprising:

(i) a control program code for receiving and storing data about the relative orientation of at least a first celestial body to a second celestial body, the data representing a plurality of images;

(ii) a control program code for controlling a dome projector situated within the dome, and oriented so as to project at least partially onto the inner surface of dome, and adapted to produce a first projected image of the first celestial body on the inner surface of dome;

(iii) a control program code for controlling two or more peripheral projectors, the peripheral projectors being disposed about the lower side wall of the dome, with each of the peripheral projectors oriented so as to project on complementary portions of the outer surface of the reflective sphere, and adapted to produce a first sphere projected image corresponding to the second celestial body on such outer surface;

(iv) wherein, upon receipt of an instruction corresponding to a change in relative orientation of the first and second celestial bodies, the control program code applies a quaternion operation for creating a subsequent projected image from the data to illustrate the change in orientation of the first celestial body to the second celestial body.

11. The computer readable medium of claim 10, wherein the plurality of peripheral projectors are disposed at substantially equidistant points about the lower side wall of the dome.

12. The computer readable medium of claim 10, wherein the dome projector further comprises a hemispheric mirror, and wherein the dome projector is peripherally mounted along with the hemispheric mirror, the hemispheric mirror being configured within the path of the dome projector output, so that the dome projector is able to project at least partially onto the hemispheric mirror, and the dome projector and hemispheric mirror are configured so as to project onto the interior surface to produce the first dome projected image of a first celestial body on the inner surface.

13. The computer readable medium of claim 10, wherein the reflective sphere comprises a shell that defines an interior space; and the dome projector is disposed at least partially within the interior space, and is oriented so as to project at least partially onto the inner surface of the dome.

14. The computer readable medium of claim 10, wherein the dome projector further comprises a fish eye lens; wherein the reflective sphere comprises a shell that defines and surrounds an interior space, the shell having a projection port at an upper end of the sphere; and wherein the dome projector is disposed within the interior space, and is oriented so as to project through the projection port, through the fish eye lens, and at least partially onto the inner surface of the dome.

15. The computer readable medium of claim 10, wherein the dome further comprises at least one mobile screen configured for transport along a desired path and at least one mobile screen projector adapted to project at least partially onto the at least one mobile screen, wherein the computer readable medium further comprises:

(i) control program code for directing the transport of the at least one mobile screen and for directing the at least one mobile screen projector, wherein, upon the receipt of an instruction relative to the creation of a mobile image, the control program applies an image suitable for the mobile screen from the at least one mobile screen projector onto the at least one mobile screen.

* * * * *